H. V., O. S. & C. F. LEE.
BEET HARVESTER.
APPLICATION FILED MAY 15, 1909.
938,881.
Patented Nov. 2, 1909.
4 SHEETS—SHEET 1.
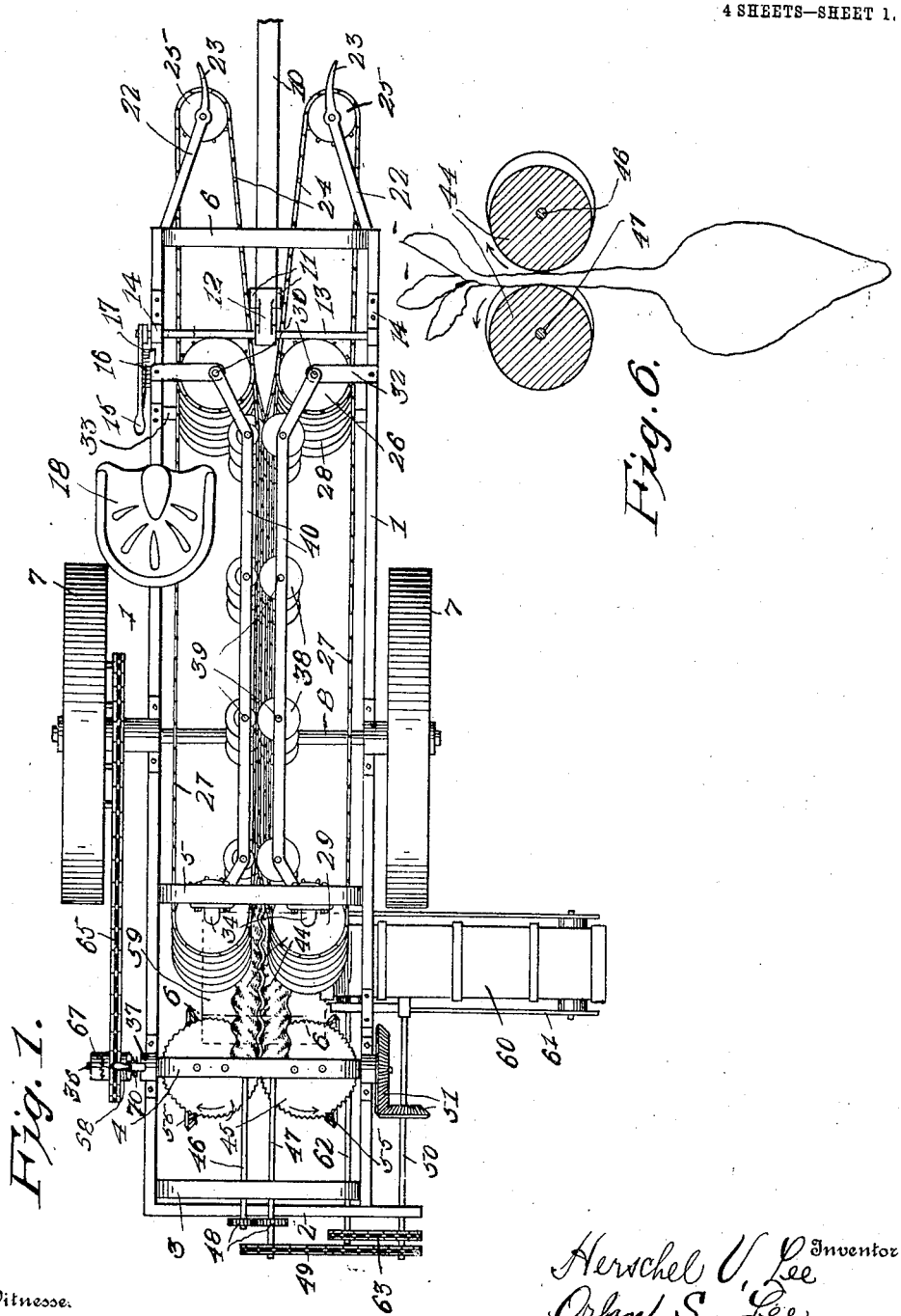
Witnesses
James F. Crown
E. M. Ricketts
Inventors
Herschel V. Lee
Orlan S. Lee
Crawford F. Lee
By Walton E. Coleman
Attorney

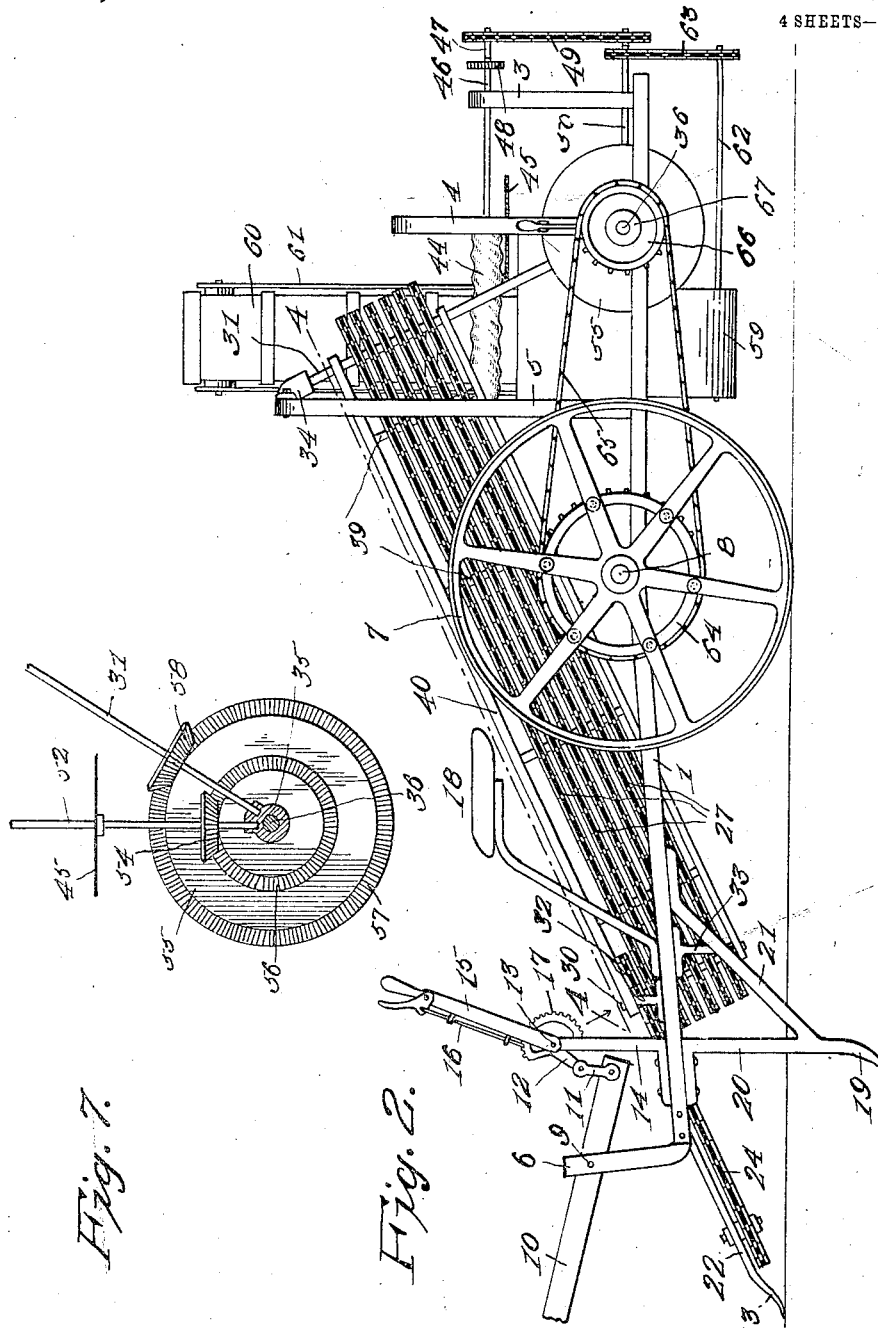

H. V., O. S. & C. F. LEE.
BEET HARVESTER.
APPLICATION FILED MAY 15, 1909.
938,881.
Patented Nov. 2, 1909.
4 SHEETS—SHEET 3.
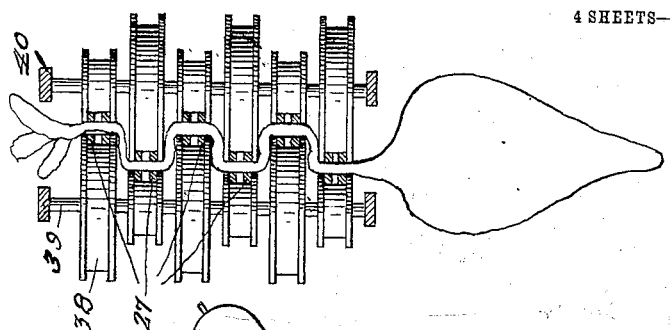
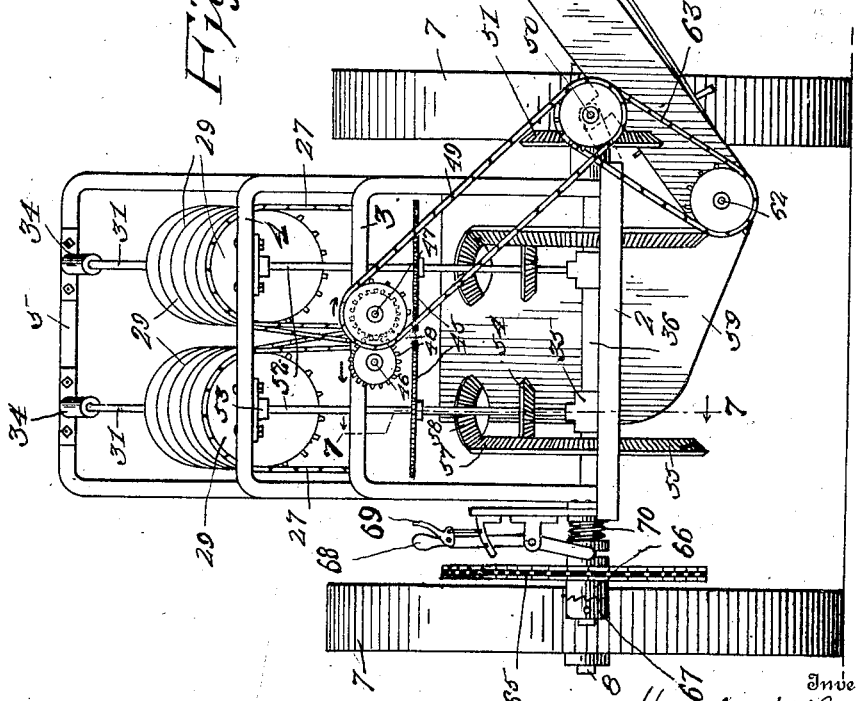
Witnesses
James F. Crown
E. M. Ricketts
Inventors
Herschel V. Lee
Orlan S. Lee
Crawford F. Lee
By Watson E. Coleman
Attorney

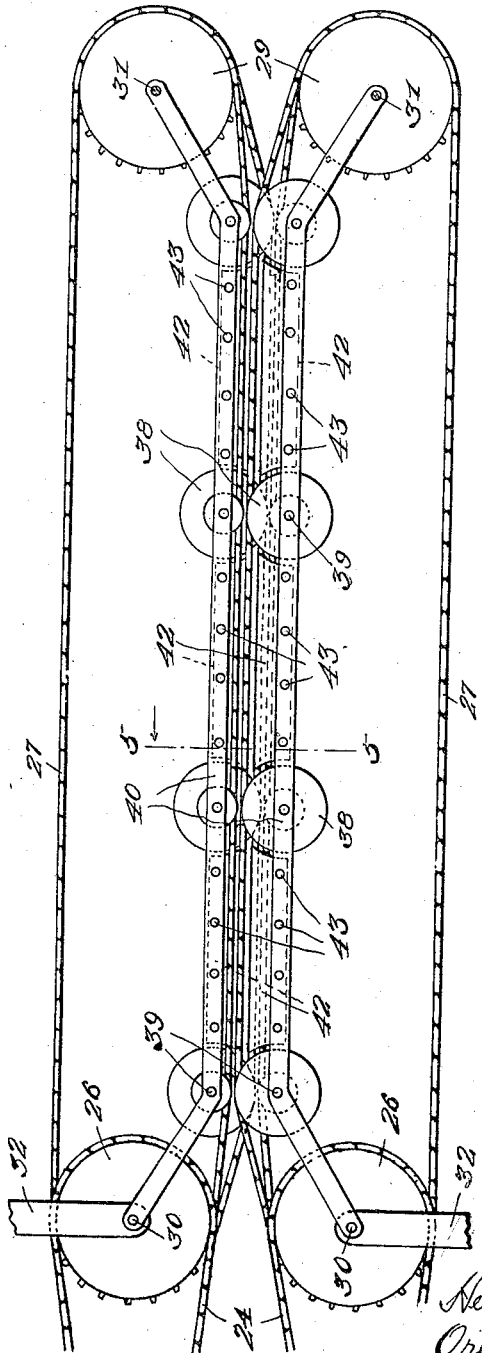

UNITED STATES PATENT OFFICE.

HERSCHEL V. LEE, ORLAN S. LEE, AND CRAWFORD F. LEE, OF YOUNGSTOWN, INDIANA, ASSIGNORS OF ONE-HALF TO ALBERT E. HAZELRIGG AND CLAY LADD, OF TERRE HAUTE, INDIANA.

BEET-HARVESTER.

938,881.

Specification of Letters Patent.

Patented Nov. 2, 1909.

Application filed May 15, 1909. Serial No. 496,197.

*To all whom it may concern:*

Be it known that we, HERSCHEL V. LEE, ORLAN S. LEE, and CRAWFORD F. LEE, citizens of the United States, residing at Youngstown, in the county of Vigo and State of Indiana, have invented certain new and useful Improvements in Beet-Harvesters, of which the following is a specification, reference being had to the accompanying drawings.

This invention relates to improvements in machines for harvesting beets or similar vegetables.

The object of the invention is to provide a simple and practical machine of this character which has improved means for digging the beets, improved means for pulling and elevating them and improved means for cutting or topping them, means being also provided for conveying the body portions of the beets to a wagon which travels alongside of the machine.

With the above and other objects in view, the invention consists of the novel features of construction and the combination and arrangement of parts hereinafter fully described and claimed, and illustrated in the accompanying drawings, in which—

Figure 1 is a plan view of the improved beet harvester; Fig. 2 is a side elevation; Fig. 3 is a rear elevation; Fig. 4 is a detail horizontal section taken on the plane indicated by the line 4—4 in Fig. 2; Fig. 5 is a detail vertical section taken on the plane indicated by the line 5—5 in Fig. 4; Fig. 6 is a detail vertical section taken on the plane indicated by the line 6—6 in Fig. 1; and Fig. 7 is a detail vertical section taken on the plane indicated by the line 7—7 in Fig. 3.

The main frame or body of the machine is preferably composed of longitudinal side beams 1 united by a rear cross beam 2 and by a series of upright arches 3, 4, 5, 6. The rear portion of the frame is mounted on supporting and drive wheels 7 carried by a shaft or axle 8 arranged transversely on the intermediate portions of the side beams 1. Pivoted at 9 to the front arch 6 is a draft tongue 10 to which the animals are hitched. For the purpose of raising and lowering the front end of the frame, the rear end of said tongue is connected by links 11 to a centrally arranged arm 12 on a transverse rock shaft 13 journaled in upright bearing brackets 14 on the forward portions of the side beams 1. Fixed to one end of the rock shaft 13 is an adjusting lever 15 carrying a hand retracted pawl 16 for engagement with a segmental locking rack 17 fixed to one of the brackets 14, whereby the front end of the frame may be secured in an adjusted position.

18 denotes a driver's seat secured to one of the side beams of the frame within reach of the lever 15.

The beet or vegetable digging mechanism comprises two inwardly and forwardly turned digging plows 19 provided on the lower ends of standards 20 depending from the forward portions of the side beams 1 and reinforced by inclined braces 21, as clearly shown in Fig. 2. This digging mechanism is arranged in advance of the beet pulling and elevating mechanism presently explained, but in rear of means for picking up the foliage of the beets and directing them into the pulling and elevating mechanism. This improved foliage elevating and deflecting mechanism consists of two arms attached to the front ends of the side beams 1 and inclined downwardly and inwardly in a forward direction and having their extremities curved downwardly and outwardly to form deflecting fingers 23. These fingers pick the foliage up off of the ground and deflect it against the inner converging stretches of foliage elevating chains 24 disposed in an upwardly and rearwardly inclined plane. The lower ends of the chains 24 pass around guide sprocket wheels 25 journaled on the arms 22 and the upper ends of said chains pass around driving sprocket wheels 26 mounted as presently explained.

The improved beet pulling and elevating mechanism comprises a plurality of superposed pairs of flexible endless belts such as sprocket chains between the opposing stretches or runs of which the foliage of the beets is held. To render the gripping action of these chains effective, the opposing runs or stretches of each pair are offset laterally with respect to those of the next adjacent pair, whereby the foliage of the beets will be bent into zigzag shape, as clearly shown in Fig. 5, to cause the beets to be effectively gripped. Said superposed pairs of pulling and elevating chains which are designated by the numeral 27 are inclined upwardly and rearwardly so that the beets will be pulled and elevated and said chains pass around sprocket wheels 28, 29 journaled on upwardly and inwardly inclined shafts 30, 31. The short forward shafts 30 are journaled in bearing brackets 32, 33 fixed to the side beams 1 and on these shafts are also fixed the sprocket wheels 26 so that the foliage elevating chains or belts 24 will be driven from the pulling and elevating mechanism. The rear shafts 31 are of greater length and have their upper ends journaled in bearings 34 on the arch 5 while their lower ends are journaled in bearings 35 carried by a transverse countershaft 36 arranged upon the rear portion of the frame and journaled in bearings 37 upon its side beams 1. For the purpose of holding the inner stretches of the pulling and elevating chains or belts 27 close to each other and supporting them against lateral pressure, pairs of large and small flanged rollers 38 are mounted on upright shafts 39 carried by longitudinal bars 40, which latter have bent or offset ends supported by the shafts 30 and 31. If desired, supporting blocks or strips 42 may be bolted or otherwise secured, as at 43, to the bars 40 to support the portions of the inner stretches of the chains between said rollers 38, as shown in Fig. 4 of the drawings.

The beet pulling and elevating member just described elevates the beets to two horizontally disposed and longitudinally extending worms 44 arranged in advance of a cutting mechanism consisting, preferably, of two rotating cutting disks or blades 45. The worms 44 receive the foliage of the beets between them and not only feed the beets rearwardly but also pull the foliage upwardly so that the upper ends of the body portions of the beets will be held close to the bottom faces of the worms, which latter are disposed immediately above the cutting disks 45 in order that the beets will be uniformly topped close to said upper ends of their bodies. The worms 44 have registering spirally arranged grooves and ribs to effect the result just mentioned and they turn in opposite directions indicated by the arrows in Fig. 6. Said worms are fixed to horizontal shafts 46, 47 connected by meshing cog gears 48 so that they turn in unison. The projecting rear end of the shaft 47 is connected by a sprocket chain gearing 49 to a longitudinally extending shaft 50, which is in turn connected by beveled gears 51 to one end of the countershaft 36, as shown more clearly in Fig. 1 of the drawings. The cutting disks 45 are fixed to vertical shafts 52 journaled at their lower ends in the bearings 35 and at their upper ends in bearings 53 secured to the arch 4. The cutting disks 45 are preferably toothed, as shown. On the lower portions of the shafts 52 are beveled pinions 54 which mesh with gears 55 fixed to the countershaft 36 and having inner rows of beveled gear teeth 56 which mesh with the pinions 54 and outer rows of beveled gear teeth 57 which mesh with beveled pinions 58 fixed to the shafts 31 of the beet pulling and elevating mechanism.

The body portions of the beets, after their tops or foliage have been severed by the cutting device 45 drop into a receiving box or chute 59 having an inclined bottom which conducts them to a discharge elevator 60 preferably in the form of a slatted endless belt arranged in an upwardly and laterally projecting frame 61 carried by the main frame. Said discharge elevator or conveyer 60 has its lower end passing around a driving roller on a longitudinally extending shaft 62, the rear end of which latter is connected by a sprocket chain gearing 63 to the shaft 50.

It will be seen that all of the parts of the machine are driven from the countershaft 36, which latter is in turn driven from one of the wheels 7 by attaching to the latter a sprocket wheel 64 which is connected by a sprocket chain 65 to a sprocket pinion 66 loosely arranged on the shaft 36 for sliding movement. One end of the hub of the pinion or wheel 66 forms a clutch member which co-acts with a clutch member 67 fixed to the shaft 36 for rotation therewith. The other end of the hub of the pinion 66 is operatively connected to a clutch operating lever 68 mounted on the frame and adapted to be locked in adjusted position by a segmental rack and pawl device 69. A coil spring 70 is arranged on the shaft 36 and tends to force the pinion 66 normally into engagement with the clutch member 67.

In operation, the machine is drawn through a field and over a row of beets by draft animals hitched to the tongue 10. The plows 19 loosen the earth on opposite sides of the beets and the deflecting fingers 23 and chains 24 elevate and deflect the foliage of the beets between the pulling and elevating chains 27, which latter effectively grip the foliage of the beets between their opposing stretches and not only pull the beets out of the ground but elevate them to the feeding worms 44, which latter also serve as gage devices to hold the beets in a proper position with respect to the cutting disks 45 so that they will be uniformly topped. The body portions of the beets fall into the hopper 59 and from the latter are elevated by the conveyer 60 which discharges them into a wagon drawn through the field alongside of the machine. By adjusting the lever 15, the front end of the frame, and hence the digging mechanism, may be raised or lowered as may be found necessary and said end of the frame may also be elevated entirely out of the ground when the machine is to be moved from place to place. By operating the lever 68, the machine may be readily thrown into or out of gear.

Having thus described the invention what is claimed is:

1. In a machine of the character described, a pulling mechanism consisting of two downwardly inclined series of superposed endless chains, the chains of one series being opposed to those of the other, suitably mounted shafts, sprocket wheels upon said shafts for said chains, longitudinally extending bars having offset ends supported from said shafts, other shafts journaled upon said bars, large and small flanged supporting rollers upon the last mentioned shafts and adapted to engage the opposing stretches of the chains to support the same against lateral movement, the large rollers on said second mentioned shafts alternating with the small rollers thereon and being disposed opposite the small rollers on the opposing shafts, whereby the inner stretches of the opposing chains of the two series will be laterally offset with respect to each other to cause the foliage of the vegetable to be bent into zigzag shape and effectively gripped by the chains and means for driving said chains.

2. In a machine of the character described, a pulling mechanism consisting of two downwardly inclined series of superposed endless chains, the chains of one series being opposed to those of the other, suitably mounted shafts, sprocket wheels upon said shafts for said chains, longitudinally extending bars having offset ends supported from said shafts, other shafts journaled upon said bars, large and small flanged supporting rollers upon the last mentioned shafts and adapted to engage the opposing stretches of the chains to support the same against lateral movement, the large rollers of said second mentioned shafts alternating with the small rollers thereon and being disposed opposite the small rollers on the opposing shafts, whereby the inner stretches of the opposing chains of the two series will be laterally offset with respect to each other to cause the foliage of the vegetable to be bent into zigzag shape and effectively gripped by the chains, longitudinally extending supporting strips secured to said bars between the flanged rollers and projecting inwardly to support the inner opposing stretches of the chains, and means for driving said chains.

3. In a machine of the character described, the combination of a pulling mechanism consisting of two downwardly inclined series of superposed endless chains, the chains of one series being opposed to those of the other, suitably mounted shafts, sprocket wheels upon said shafts for said chains, longitudinally extending bars having offset ends supported from said shafts, other shafts journaled upon said bars, large and small flanged supporting rollers upon the last mentioned shafts and adapted to engage the opposing stretches of the chains to support the same against lateral movement, the large rollers on said second mentioned shafts alternating with the small rollers thereon and being disposed opposite the small rollers on the opposing shafts, whereby the inner stretches of the opposing chains of the two series will be laterally offset with respect to each other to cause the foliage of the vegetable to be bent into zigzag shape and effectively gripped by the chains, means for driving said chains, digging mechanism arranged in advance of said pulling mechanism, foliage deflecting fingers arranged in advance of the digging mechanism, sprocket wheels upon said fingers and upon the first mentioned shafts, and endless foliage deflecting chains passed around the last mentioned sprocket wheels.

4. In a machine of the character described, the combination of a pulling mechanism consisting of two downwardly inclined series of superposed endless chains, the chains of one series being opposed to those of the other, suitably mounted shafts, sprocket wheels upon said shafts for said chains, longitudinally extending bars having offset ends supported from said shafts, other shafts journaled upon said bars, large and small flanged supporting rollers upon the last mentioned shafts and adapted to engage the opposing stretches of the chains to support the same against lateral movement, the large rollers on said second mentioned shafts alternating with the small rollers thereon and being disposed opposite the small rollers on the opposing shafts, whereby the inner stretches of the opposing chains of the two series will be laterally offset with respect to each other to cause the foliage of the vegetable to be bent into zigzag shape and effectively gripped by the chains, means for driving said chains, a digging mechanism arranged in advance of said pulling mechanism, a pair of horizontally disposed rotary cutting disks, horizontally disposed, longitudinally extending rotary feeding worms arranged to receive the vegetables from the pulling chains and to move them against the cutting disks and means for actuating said feeding worms and cutting disks.

5. In a machine of the character described, the combination of a main frame having side bars and connecting arches, supporting and driving wheels for the rear portion of the frame, means for vertically adjusting the front portion of the frame, digging shovels secured to the forward portions of the side bars of the frame and depending therefrom, brackets upon the forward portions of the side bars, a transverse shaft upon the rear portion of the frame and driven from one of said supporting and drive wheels, bearings upon said shaft and one of the arches of said frame, forwardly inclined rear shafts journaled in said bearings, forwardly inclined front shafts journaled in said brackets, opposing series of superposed pulling chains mounted upon and driven from said front and rear inclined shafts and means for imparting the motion of said transverse shaft to said rear inclined shafts.

6. In a machine of the character described, the combination of a main frame having side bars and connecting arches, supporting and driving wheels for the rear portion of the frame, means for vertically adjusting the front portion of the frame, digging shovels secured to the forward portions of the side bars of the frame and depending therefrom, brackets upon the forward portions of the side bars, a transverse shaft upon the rear portion of the frame and driven from one of said supporting and drive wheels, bearings upon said shaft and one of the arches of said frame, forwardly inclined rear shafts journaled in said bearings, forwardly inclined front shafts journaled in said brackets, opposing series of superposed pulling chains mounted upon and driven from said front and rear inclined shafts, foliage deflecting fingers projecting from the forward end of the main frame, foliage deflecting chains supported by said fingers and driven from said front inclined shafts, horizontally disposed cutting disks, shafts for the latter, horizontally disposed feeding worms between the pulling chains and said cutting disks, shafts for said worms and means for driving the worm shafts, the cutter shafts and the rear inclined shafts from said transverse bar.

7. In a machine of the character described, the combination of a main frame having side bars and connecting arches, supporting and driving wheels for the rear portion of the frame, means for vertically adjusting the front portion of the frame, digging shovels secured to the forward portions of the side bars of the frame and depending therefrom, brackets upon the forward portions of the side bars, a transverse shaft upon the rear portion of the frame and driven from one of said supporting and drive wheels, bearings upon said shaft and one of the arches of said frame, forwardly inclined rear shafts journaled in said bearings, forwardly inclined front shafts journaled in said brackets, opposing series of superposed pulling chains mounted upon and driven from said front and rear inclined shafts, horizontally disposed cutter disks, upright shafts for the latter, bearings for the last mentioned shafts arranged in one of the arches of the main frame and on said transverse shaft, horizontally disposed feeding worms between the pulling chains and the cutting disks, shafts for said worms, a receiving receptacle arranged beneath said worms and cutting disks, a laterally projecting discharge conveyer extending from said receiving receptacle, and means for imparting the motion of said transverse shaft to said discharge conveyer, to the shafts of the feeding worms, to the shafts of the cutting disks and to said rear inclined shafts.

In testimony whereof we hereunto affix our signatures in the presence of two witnesses.

HERSCHEL V. LEE.
ORLAN S. LEE.
CRAWFORD F. LEE.

Witnesses:
ABE T. HAZELRIGG,
L. M. ASHER.